United States Patent
Cottet et al.

(10) Patent No.: US 10,486,798 B2
(45) Date of Patent: Nov. 26, 2019

(54) AIRCRAFT LANDING GEAR ASSEMBLY AND METHOD OF ASSEMBLING THE SAME

(71) Applicant: The Boeing Company, Chicago, IL (US)

(72) Inventors: Justin Cottet, Snohomish, WA (US); James Cusworth, Snohomish, WA (US); George Sonnenburg, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 359 days.

(21) Appl. No.: 15/490,440

(22) Filed: Apr. 18, 2017

(65) Prior Publication Data

US 2018/0297694 A1  Oct. 18, 2018

(51) Int. Cl.
| | | |
|---|---|---|
| *B64C 25/12* | (2006.01) | |
| *B64C 25/34* | (2006.01) | |
| *B64C 25/60* | (2006.01) | |
| *B64C 3/00* | (2006.01) | |

(52) U.S. Cl.
CPC ............ *B64C 25/12* (2013.01); *B64C 3/00* (2013.01); *B64C 25/34* (2013.01); *B64C 25/60* (2013.01); *B64C 2025/125* (2013.01)

(58) Field of Classification Search
CPC ... B64C 25/12; B64C 25/34; B64C 2025/125; B64C 3/00; B64C 25/60
See application file for complete search history.

(56) References Cited

U.S. PATENT DOCUMENTS

| | | |
|---|---|---|
| 4,199,119 A | 4/1980 | Masclet |
| 6,360,990 B1 | 3/2002 | Grossman |
| 7,416,156 B2 | 8/2008 | Hinton |
| 8,070,095 B2 | 12/2011 | Luce et al. |
| 8,186,620 B2 | 5/2012 | Luce et al. |
| 8,985,511 B2 | 3/2015 | Mellor et al. |
| 9,321,525 B2 | 4/2016 | Luce |
| 2015/0069178 A1* | 3/2015 | Brown ............... B64C 25/12 244/102 R |
| 2018/0244373 A1* | 8/2018 | Mellor ............... B64C 25/26 |
| 2018/0346102 A1* | 12/2018 | Dahl ............... B64C 25/04 |

FOREIGN PATENT DOCUMENTS

FR    3018501 A1    9/2015

OTHER PUBLICATIONS

European Search Report for related Application No. 18152217.8-1010, dated Mar. 9, 2018, 7 pages.

* cited by examiner

*Primary Examiner* — J. Woodrow Eldred
(74) *Attorney, Agent, or Firm* — Armstrong Teasdale LLP

(57) ABSTRACT

A landing gear assembly for use with an aircraft includes a housing including a trunnion brace, a drag brace, and an aft brace that together define an opening through the housing. The landing gear assembly also includes a shrink link assembly coupled to the housing such that the shrink link assembly is accessible through the opening.

20 Claims, 11 Drawing Sheets

AIRCRAFT LANDING GEAR ASSEMBLY AND METHOD OF ASSEMBLING THE SAME

BACKGROUND

The field of the disclosure relates generally to aircraft landing gear assemblies, and more specifically, to aircraft landing gear assemblies that include a housing and a shrink link assembly positioned within the housing.

At least some known aircraft include landing gear assemblies including an outer cylinder and an inner cylinder positioned therein. The inner cylinder slides within the outer cylinder, via a shrink link assembly, to deploy or retract a wheel assembly. However the length of travel of the inner cylinder may be limited by the shape of the outer cylinder and the configuration of the shrink link assembly. Furthermore, the shape of at least some known outer cylinders restricts access to the inner cylinder, which may increase the complexity, and therefore the costs and duration, of required maintenance on the inner cylinder. Additionally, at least some known shrink link assemblies are connected to the inner cylinder using intermediary components, such as cranks and gears that form an offset torsion load path through the shrink link assembly. Such a offset load paths may load components of the shrink link assembly or other components of the landing gear assembly under high forces. These high forces may lead to a shortened service lifetime of the components or may lead to larger components that increase the weight of the aircraft.

BRIEF DESCRIPTION

In one aspect, a landing gear assembly for use with an aircraft is provided. The landing gear assembly includes a housing including a trunnion brace, a drag brace, and an aft brace that together define an opening through the housing. The landing gear assembly also includes a shrink link assembly coupled to the housing such that the shrink link assembly is accessible through the opening.

In another aspect, an aircraft is provided. The aircraft includes a wing structure and a landing gear assembly pivotally coupled to the wing structure. The landing gear assembly is moveable between a deployed position and a retracted position and includes a housing including a trunnion brace, a drag brace, and an aft brace that together define an opening through the housing. The landing gear assembly also includes a shrink link assembly coupled to the housing such that the shrink link assembly is accessible through the opening.

In yet another aspect, a method of assembling a landing gear assembly for use in an aircraft is provided. The method includes coupling a trunnion brace, a drag brace, and an aft brace of a landing gear assembly housing together to define an opening through the housing. The method also includes coupling a shrink link assembly to the housing such that the shrink link assembly is accessible through the opening.

The features, functions, and advantages that have been discussed can be achieved independently in various embodiments or may be combined in yet other embodiments, further details of which can be seen with reference to the following description and drawings.

DETAILED DESCRIPTION

The examples described herein include an aircraft landing gear assembly having an open area that enables maintenance access to components and that also enables direct connection to fixed components of the aircraft. The landing gear assembly described herein includes a housing having a trunnion brace, a drag brace, and an aft brace that together define an opening through the housing. The landing gear assembly also includes a shrink link assembly coupled to the housing such that the shrink link assembly is accessible through the opening. A connecting link of the shrink link assembly extends through the opening in the housing to directly couple a shrink link in the housing to a fixed wing structure. The opening formed in the housing enables a technician to access the shrink links within the housing and also to access an inner cylinder, or oleo strut, which slides within the housing to change the length of the landing gear assembly. Such access allows for simplified maintenance, which reduces the maintenance costs and duration. Furthermore, the opening in the housing enables the direct connection of the connecting link between the shrink links and the wing structure. Such a direct connection simplifies the load path of the shrink link assembly and at least one of increases the service lifetime of the landing gear components and allows for the use of lower weight components, which reduces manufacturing and operating costs.

Figure 1:
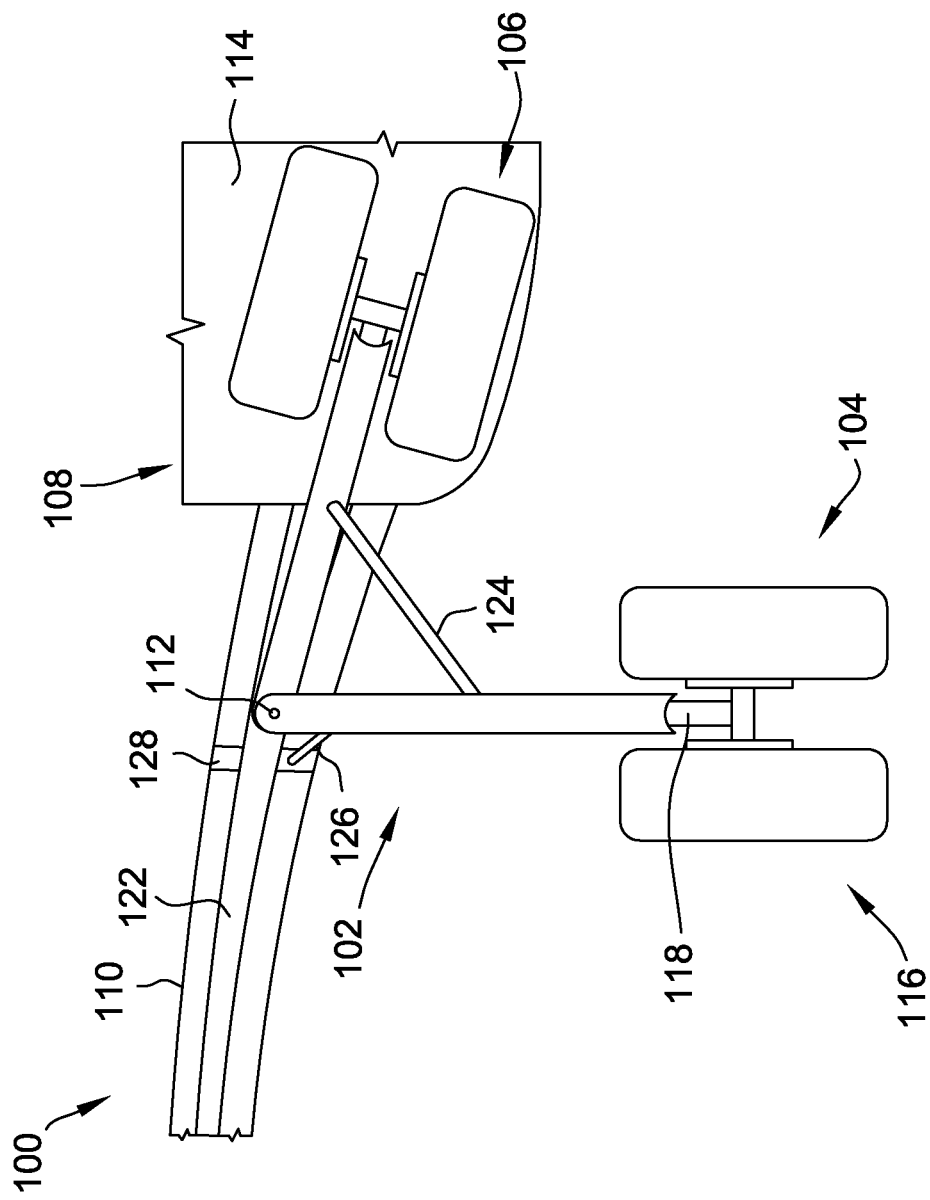
FIG. 1 is a rear view of an exemplary aircraft illustrating an exemplary landing gear assembly in a deployed position and in a retracted position.

FIG. 1 is a rear view of an exemplary aircraft 100 illustrating an exemplary landing gear assembly 102 in a deployed position 104 illustrated in solid lines and in a retracted position 106 illustrated in broken lines. In the exemplary implementation, aircraft 100 is a low-wing aircraft and landing gear assembly 102 is a wing-mounted assembly. In another implementation, aircraft 100 includes any wing-configuration and landing gear assembly 102 may be wing-mounted or fuselage-mounted. In the exemplary implementation, aircraft 100 includes a fuselage 108 and a wing 110 coupled to fuselage 108. Aircraft 100 also includes landing gear assembly 102 pivotally coupled to wing 110 such that landing gear assembly 102 is rotatable about an axis 112 between the deployed position 104 when landing gear assembly 102 is positioned below wing 110 and the retracted position 106 when landing gear assembly 102 is positioned within a landing gear bay 114 of fuselage 108.

In the exemplary implementation, landing gear assembly 102 includes a wheel assembly 116 coupled to an inner shaft or inner cylinder 118, which is slidably coupled within an outer cylinder or housing 120, as described in further detail below. Inner cylinder 118 is also known as an oleo strut. Housing 120 is coupled to wing 110 at axis 112. More specifically, housing is coupled between a first wing structure 122, such as, but not limited to, a wing spar, and a second wing structure (not shown in FIG. 1). Additionally, landing gear assembly 102 includes a side brace 124 coupled between housing 120 and one of wing 110 or fuselage 108. A connecting link 126 of landing gear assembly 102 extends from housing 120 and is coupled to a third wing structure 128, such as, but not limited to, a wing rib.

Figure 2:
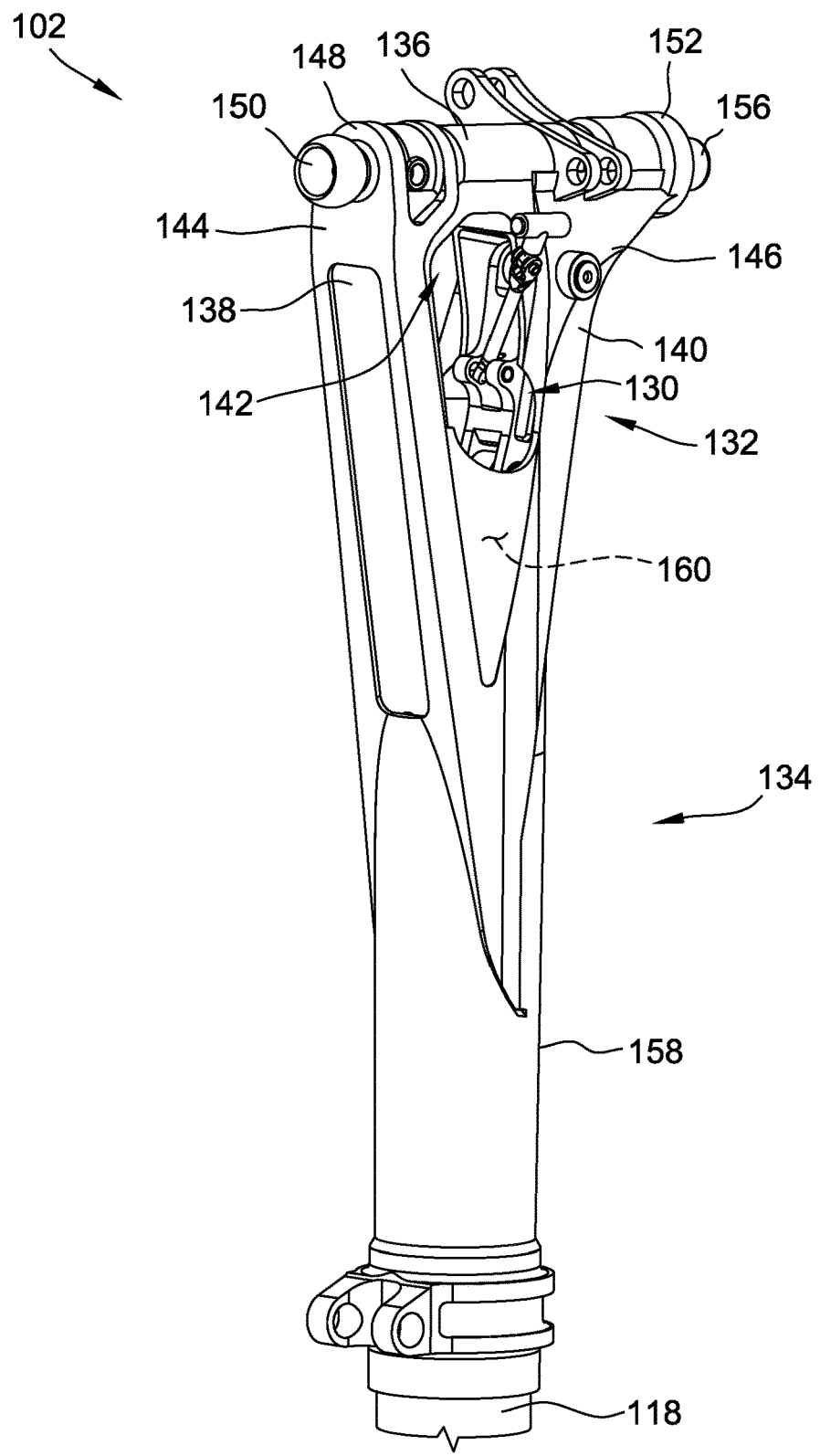
FIG. 2 is a perspective view of the landing gear assembly.
Figure 3:
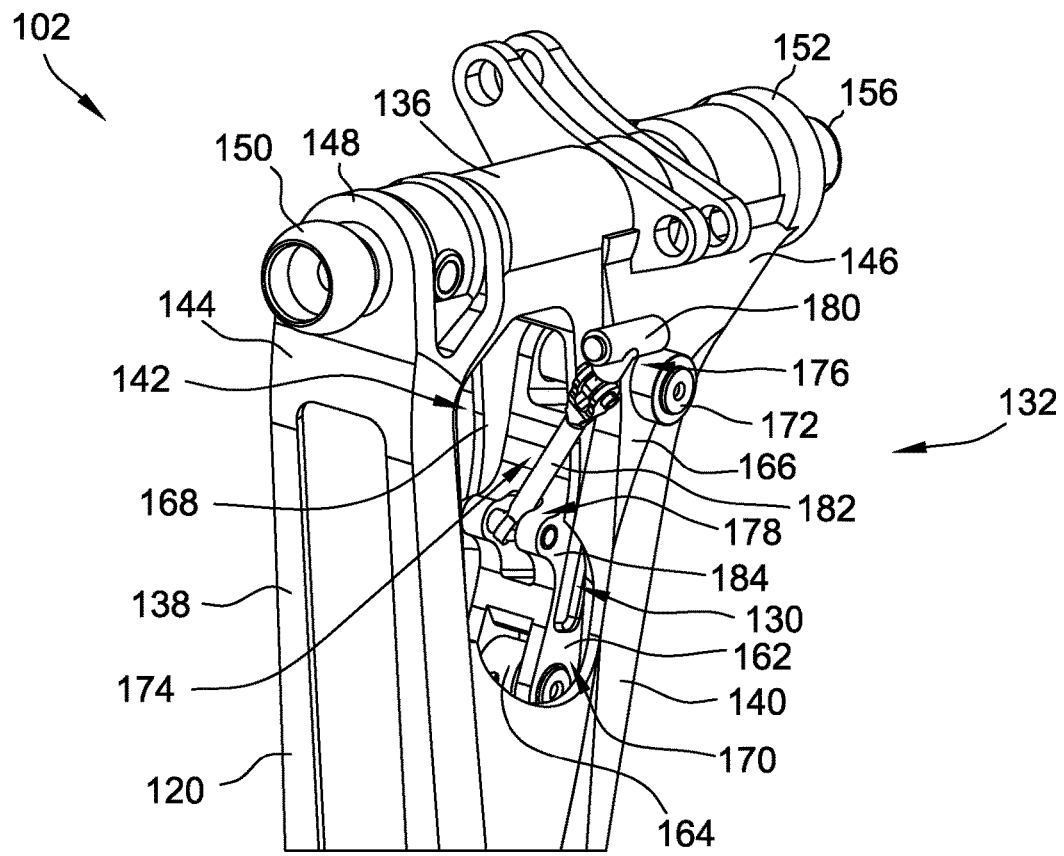
FIG. 3 is an perspective view of the landing gear assembly illustrating an exemplary shrink link assembly.
Figure 4:
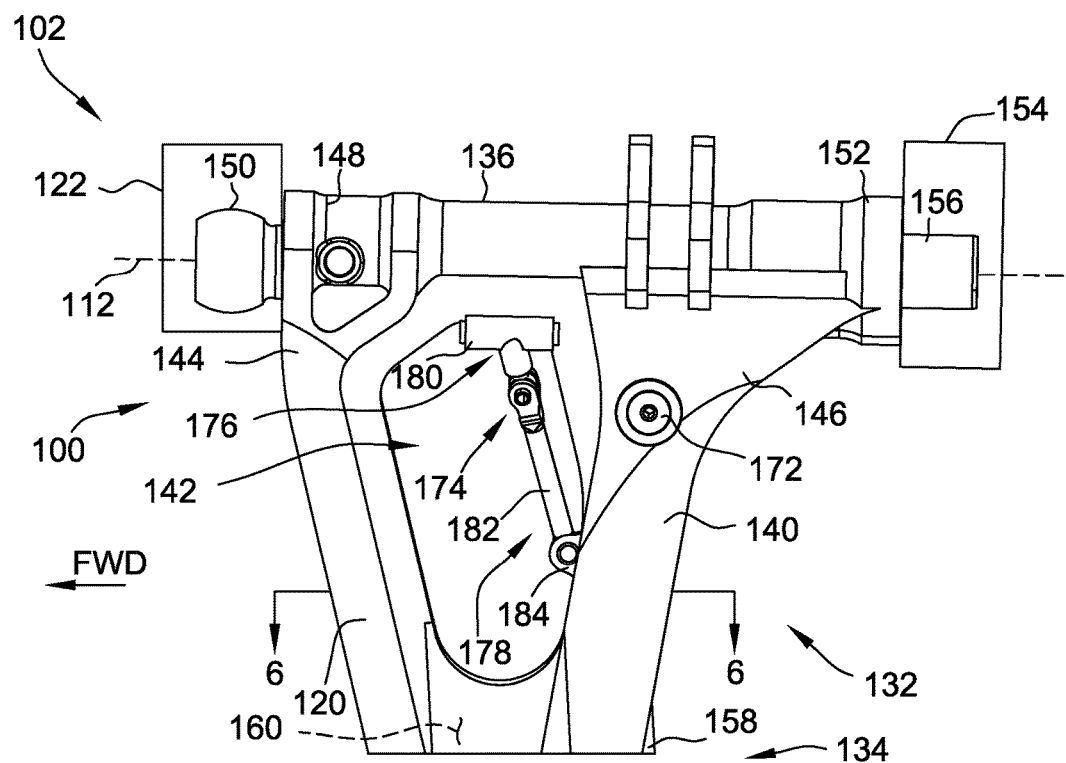
FIG. 4 is a side view of the landing gear assembly.
Figure 5:
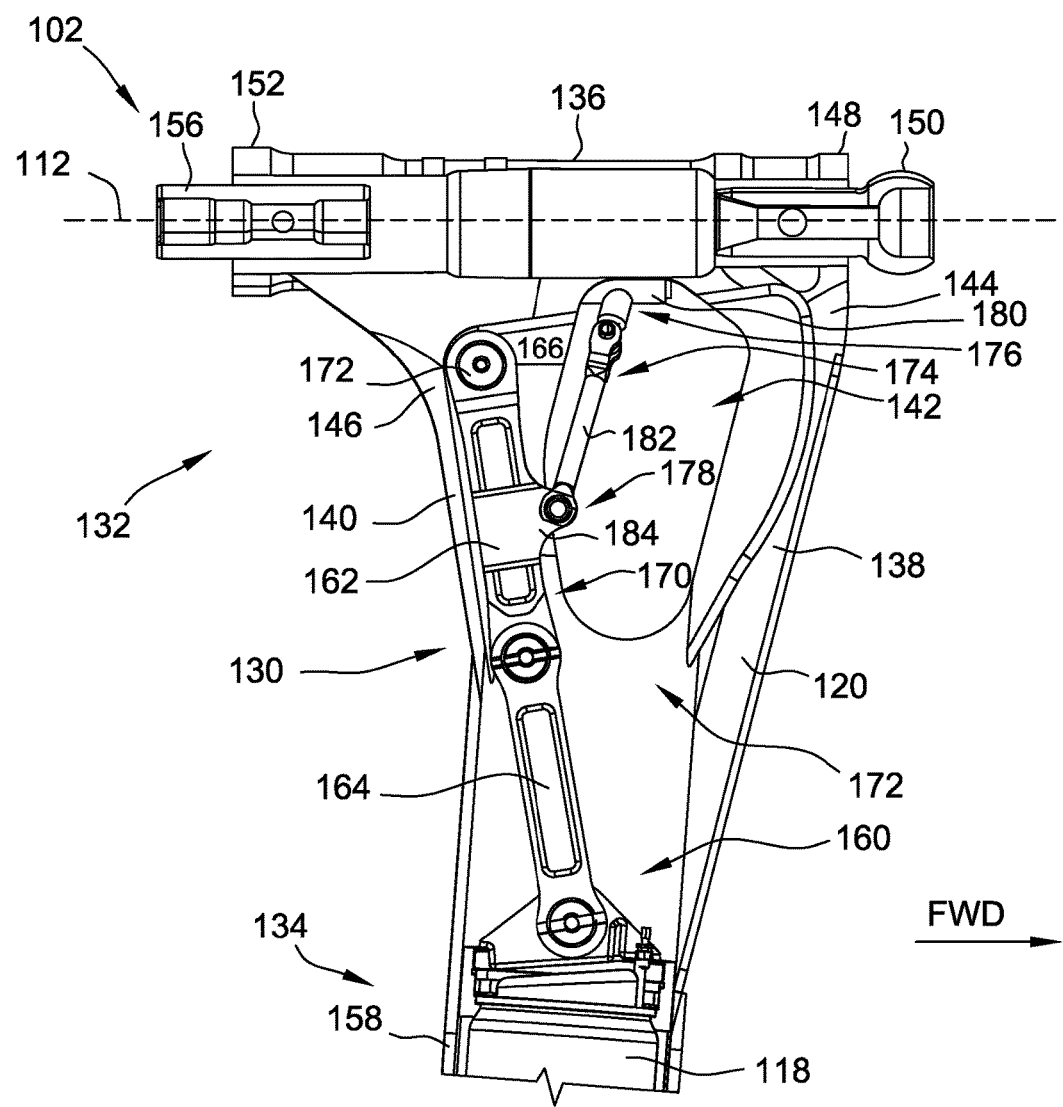
FIG. 5 is a cross-sectional side view of the landing gear assembly and the shrink link assembly.
Figure 6:
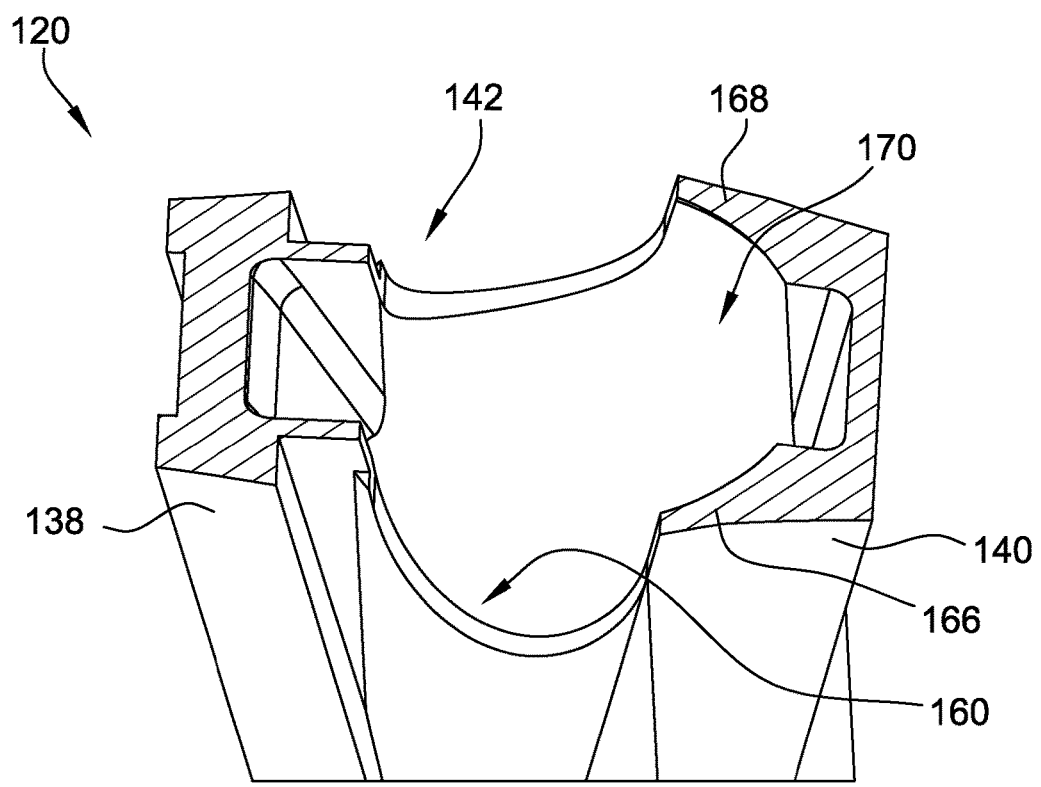
FIG. 6 is a perspective cross-sectional view of an exemplary housing of the landing gear assembly shown in FIGS. 1-5.

FIGS. 2-6 illustrate landing gear assembly 102 including housing 120 and a shrink link assembly 130 that may be used on aircraft 100 to enable landing gear assembly 102 and wheel assembly 116 to be moved between deployed position 104 that is sufficiently outboard of fuselage 108 to meet all stability requirements and, at the same time, enables storage of landing gear assembly 102 and wheel assembly 116 within portions of wing 110 and fuselage 108 when landing gear assembly 102 and wheel assembly 116 are in retracted position 106. In particular, FIG. 2 is a perspective view of landing gear assembly 102 illustrating housing 120, FIG. 3 is an enlarged perspective view of landing gear assembly 102 illustrating shrink link assembly 130, FIG. 4 is a side view of landing gear assembly 102 looking inwardly towards fuselage 108, FIG. 5 is a cross-sectional side view of landing gear assembly 102 and shrink link assembly 130 looking outwardly away from fuselage 108, and FIG. 6 is a perspective cross-sectional view of housing 120 taken along line 6-6 shown in FIG. 4.

In the exemplary implementation, landing gear assembly 102 includes housing 120 and shrink link assembly 130. As shown in FIGS. 2-6, housing 120 includes an upper portion 132 coupled to wing 110 and a lower portion 134 coupled about inner cylinder 118. More specifically, upper portion 132 includes a trunnion 136, a drag brace 138, and an aft brace 140 that together define an opening 142 that extends through upper portion 132 of housing 120. In the exemplary implementation, housing 120 is a single-piece component such that upper portion 132 and lower portion 134 are integrally formed. More specifically, trunnion 136, drag brace 138, and aft brace 140 are integrally formed together to define opening 142. As described in further details herein, shrink link assembly 130 is coupled to housing 120 and is accessible through opening 142.

As best shown in FIG. 4, drag brace 138 includes a first distal end 144, aft brace 140 includes a second distal end 146, and trunnion 136 is coupled to and extends between distal ends 144 and 146. Also as shown in FIG. 4, drag brace 138 and aft brace 140 extend obliquely away from each other such that drag brace 138 and aft brace 140 form a V-shape that at least partially defines opening 142 therebetween. Additionally, as described herein, trunnion 136 extends along axis 112 and is pivotally coupled, at a forward end 148 of trunnion 134, to first wing structure 122 via a bearing 150, and is also pivotally coupled, at an aft end 152 of trunnion 134, to a second wing structure 154, such as, but not limited to a wing rib or a landing gear beam, via a bearing 156. Landing gear assembly 102 pivots about axis 112 and trunnion 136 to facilitate moving between the deployed position 104 and the retracted position 106.

As best shown in FIG. 5, lower portion 134 of housing 120 includes a cylinder portion 158 that defines a cavity 160 that is coupled in flow communication with opening 142. More specifically, a portion of shrink link assembly 130, such as inner cylinder 118, is slidably coupled within cavity 160 such that inner cylinder 118 is accessible through opening 142, as described in further detail herein.

In the exemplary implementation, and as best shown in FIG. 5, shrink link assembly 130 includes a first link 162 coupled to aft brace 140 of housing 120, a second link 164 coupled to first link 162, and inner cylinder 118 coupled to second link 164 and slidably coupled within with cavity 160 of cylinder portion 158 of housing 120 such that inner cylinder 118 is accessible through opening 142. More specifically, as best shown in FIG. 6 where shrink link assembly 130 is not shown for clarity, aft brace 140 includes a first sidewall 166, an opposing second sidewall 168, and a channel 170 defined therebetween. In the exemplary implementation, at least a portion of shrink link assembly 130, and, more specifically, at least first link 162, is positioned within channel 170. Channel 170 is open to and coupled in flow communication with opening 142 and with cavity 160 such that channel 170, opening 142, and cavity 160 combine to form a chamber 172 within housing 120. As best shown in FIG. 3, shrink link assembly 130 also includes a shaft 172 coupled to and extending between sidewalls 166 and 168 of aft brace 140. First link 162 is pivotally coupled to shaft 172 to enable shrink link assembly 130 to move between the deployed position 104 and the retracted position 106, as described herein.

Shrink link assembly 130 also includes a connecting link 174 including a first end 176 coupled to second wing structure 128 (shown in FIG. 1) and an opposing second end 178 directly coupled to first link 162 of shrink link assembly 130. In such a configuration, connecting link 174 extends at least partially through opening 142. In the exemplary implementation, connecting link 174 includes a fixed portion 180 pivotally coupled to second wing structure 128 and a rod portion 182 pivotally coupled to both fixed portion 180 and first link 162. Specifically, rod portion 182 includes second end 178 that extends into opening 142 from outside housing 120 and is directly coupled to first link 162. More specifically, first link 162 includes a coupling mechanism 184 integrally formed on first link 162 that enables direct pivotal connection of rod portion 182 of connecting link 174.

Figure 7B:
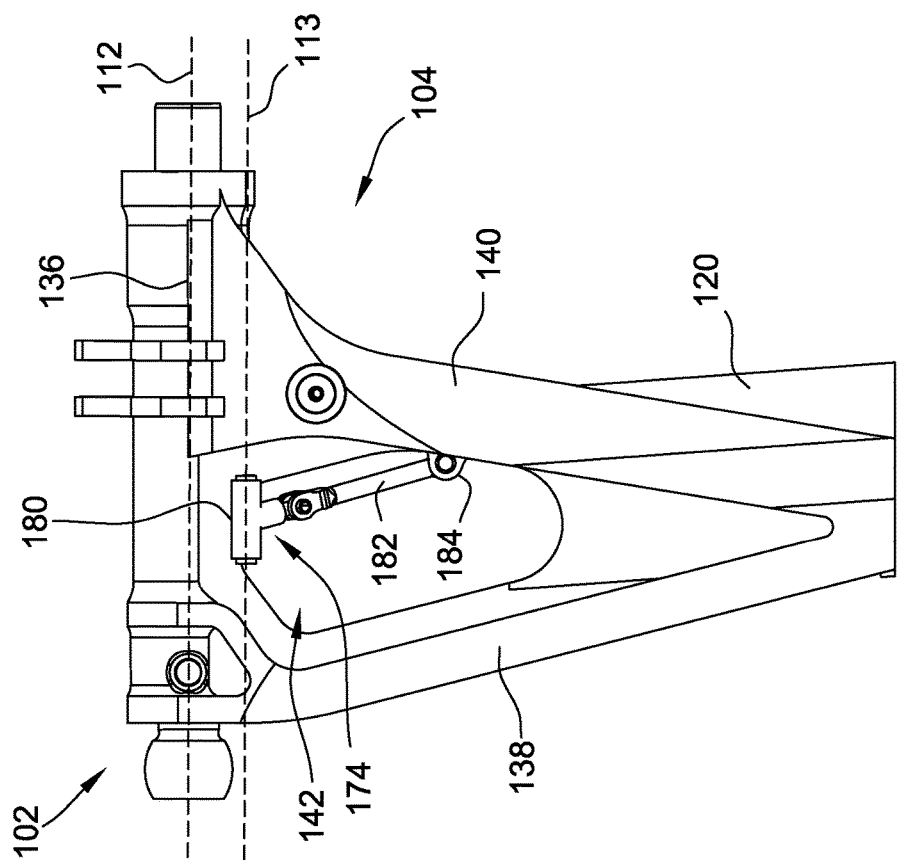
FIG. 7B is a side view of the landing gear assembly in the deployed position.
Figure 7A:
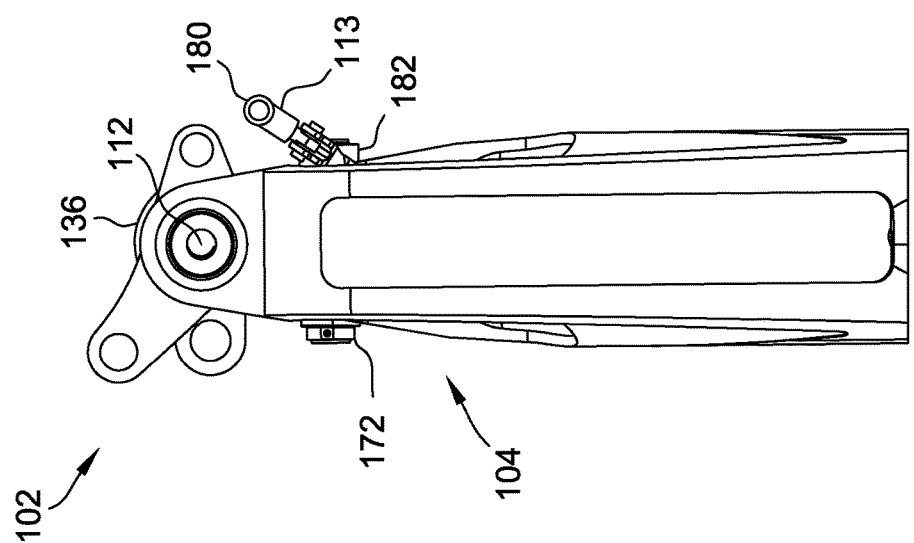
FIG. 7A is a front view of the landing gear assembly in the deployed position.
Figure 8A:
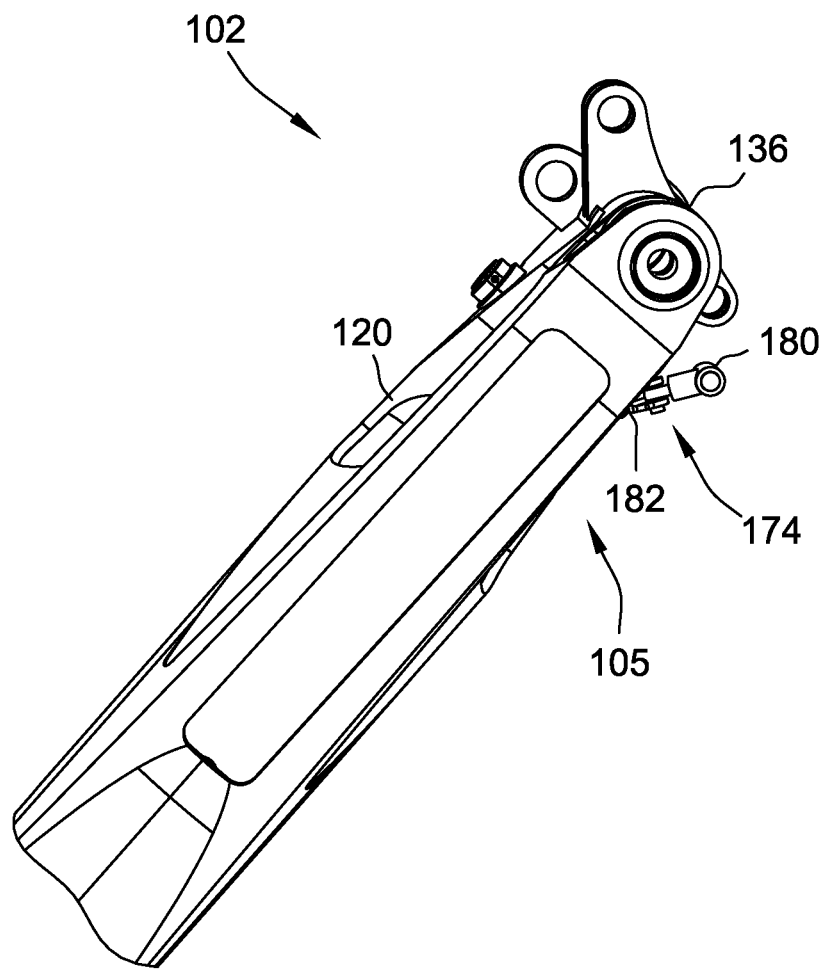
FIG. 8A is a front view of the landing gear assembly in an intermediate position.
Figure 8B:
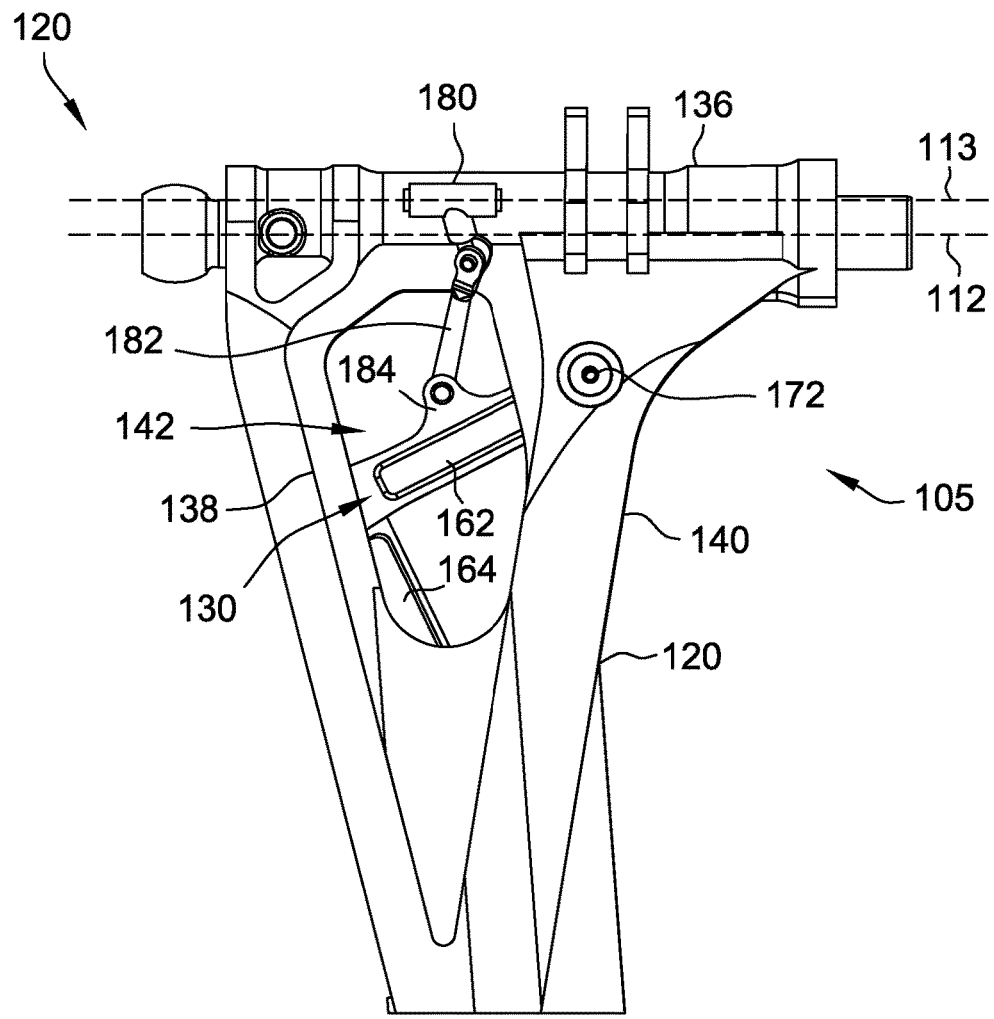
FIG. 8B is a side view of the landing gear assembly in the intermediate position.
Figure 9A:
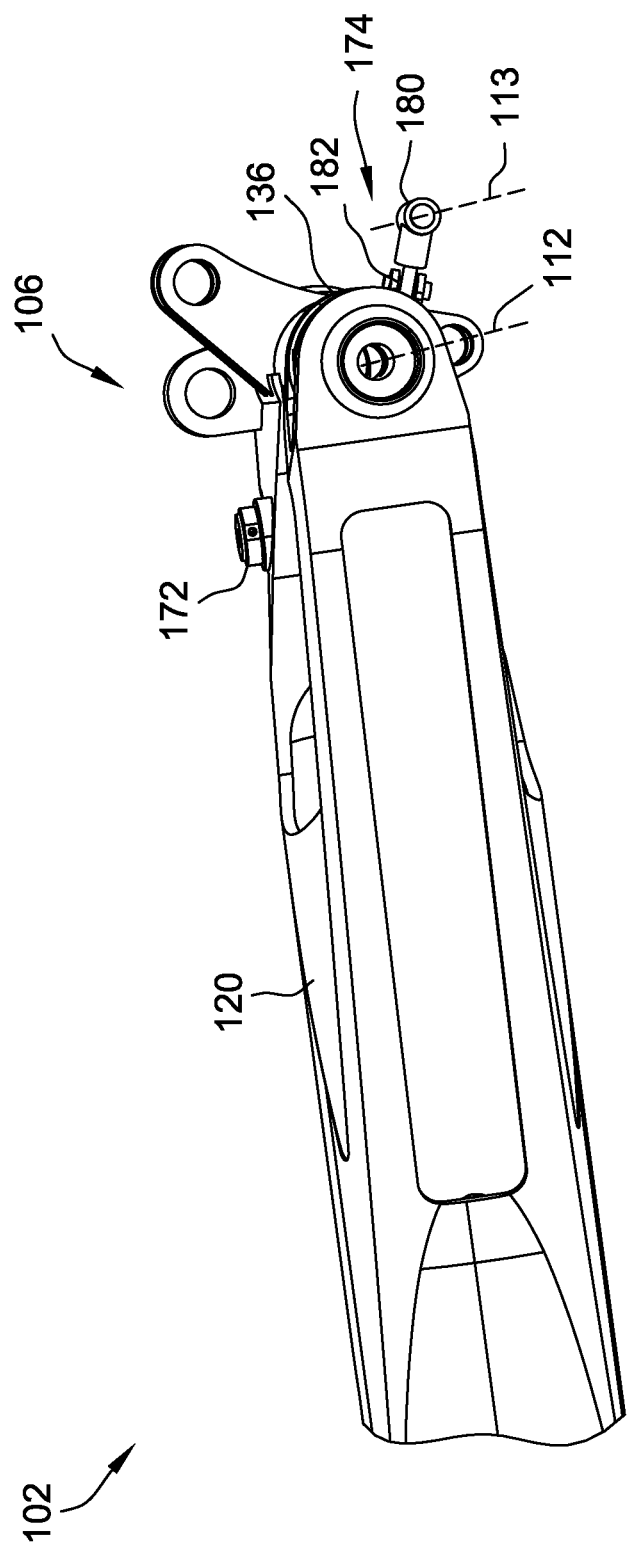
FIG. 9A is a front view of the landing gear assembly in the retracted position.
Figure 9B:
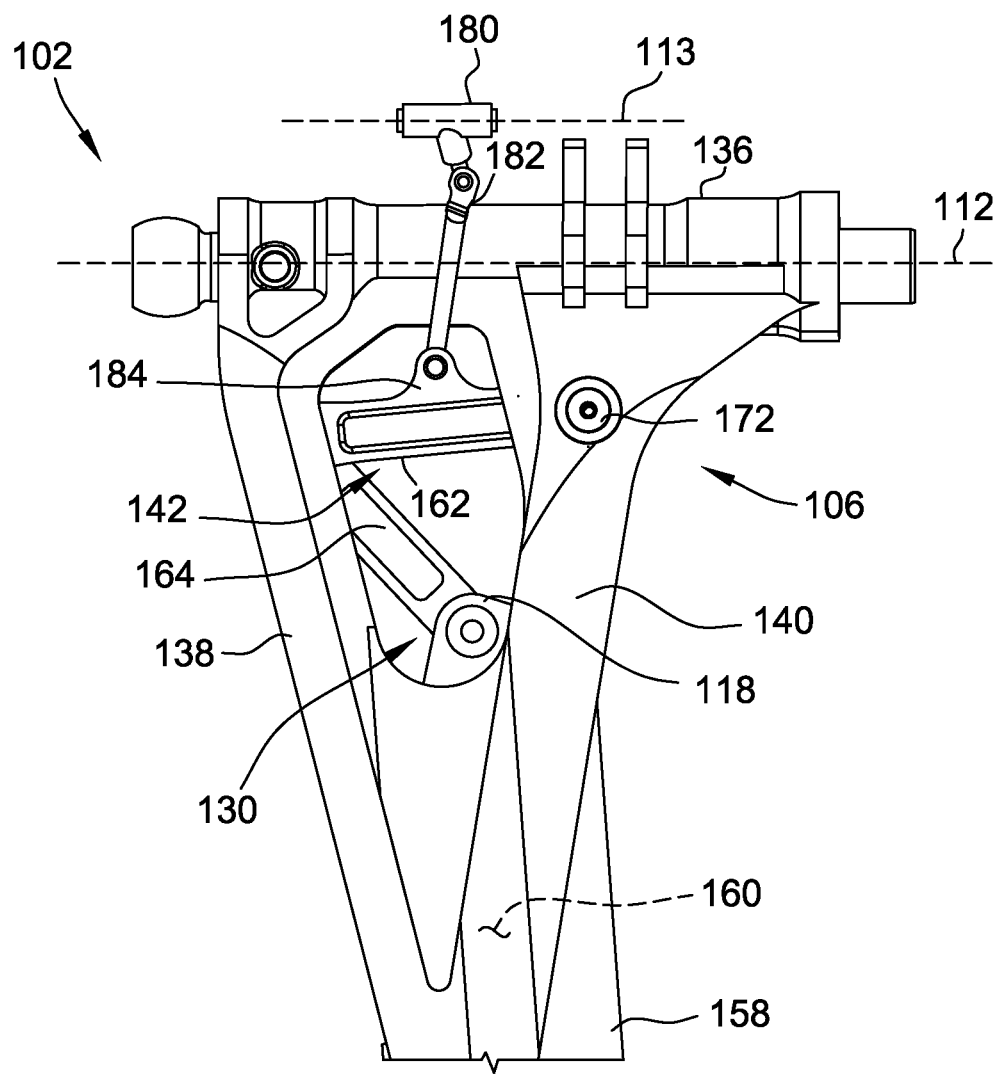
FIG. 9B is a side view of the landing gear assembly in the retracted position.

FIGS. 7A-9B illustrate landing gear assembly 102 during the retraction process after takeoff of aircraft 100. FIG. 7A is a front view of landing gear assembly 102 in the deployed position 104. FIG. 7B is a side view of landing gear assembly 102 in the deployed position 104. FIG. 8A is a front view of landing gear assembly 102 in an intermediate position 105. FIG. 8B is a side view of landing gear assembly 102 in the intermediate position 105. FIG. 9A is a front view of landing gear assembly 102 in the retracted position 106. FIG. 9B is a side view of landing gear assembly 102 in the retracted position 106.

As shown in FIGS. 7A and 7B, and as described above, when landing gear assembly 102 is in the deployed position 104, first and second links 162 and 164 are positioned within chamber 172, and more specifically, within channel 170 of aft brace 140. Connecting link 174 extends from first link 162 out of opening 142 and is coupled to second wing structure 128 (shown in FIG. 1). More specifically, rod portion 182 extends from within opening 142 and is coupled to fixed portion 180, which is coupled to second wing structure 128.

As landing gear assembly 102 moves into the intermediate position 105, as shown in FIGS. 8A and 8B, housing 120 and shrink link assembly 130 rotate about axis 112, while connecting link 174 rotates about a second axis 113. More specifically, fixed link 180 is pivotally coupled to second wing structure 128 such that fixed portion 180 moves rotationally only, similar to trunnion 136, and does not move translationally with respect to wing 110. As housing 120 and shrink link assembly 130 rotate about axis 112, shrink link assembly 130 begins to move away from axis 113. However, because fixed portion 180 is fixed to second wing structure 128 at axis 113, and because rod portion 182 is directly coupled to first link 162 through opening 142, connecting link 174 pulls up on first link 162.

As housing 120 continues to rotate about axis 112 toward the retracted position shown in FIGS. 9A and 9B, first link 162 and second link 164 rotate independently within opening 142. More specifically, first link 162 pulls up on second link 164, which consequently pulls up on inner cylinder 118 to retract inner cylinder 118 within cavity 160 of cylinder portion 158 of housing 120. When inner cylinder 118 is retracted, wheel assembly 116 (shown in FIG. 1) has moved towards trunnion 136 and the overall length of landing gear assembly 102 is reduced to enable landing gear assembly 102 to fit within landing gear bay 114 (shown in FIG. 1) of fuselage 108 (shown in FIG. 1). As such, connecting link 174 extends through opening 142 to directly couple shrink links 162 and 164 to second wing structure 128 to control the position of inner cylinder 118 within housing 120.

The examples described herein include an aircraft landing gear assembly having an open area that enables maintenance access to components and that also enables direct connection to fixed components of the aircraft. The landing gear assembly described herein includes a housing having a trunnion brace, a drag brace, and an aft brace that together define an opening through the housing. The landing gear assembly also includes a shrink link assembly coupled to the housing such that the shrink link assembly is accessible through the opening. A connecting link of the shrink link assembly extends through the opening in the housing to directly couple a shrink link in the housing to a fixed wing structure. The opening formed in the housing enables a technician to access the shrink links within the housing and also to access an inner cylinder, or oleo strut, which slides within the housing to change the length of the landing gear assembly. Such access allows for simplified maintenance, which reduces the maintenance costs and duration. Furthermore, the opening in the housing enables the direct connection of the connecting link between the shrink links and the wing structure. Such a direct connection simplifies the load path of the shrink link assembly and at least one of increases the service lifetime of the landing gear components and allows for the use of lower weight components, which reduces manufacturing and operating costs.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A landing gear assembly for use with an aircraft, said landing gear assembly comprising:
    a housing comprising a trunnion brace, a drag brace, and an aft brace that together define an opening through said housing, wherein said housing comprises a cylinder portion defining a cavity;
    an inner cylinder positioned within said cavity, wherein said inner cylinder is accessible through said opening; and
    a shrink link assembly coupled between said inner cylinder and said housing and positioned at least partially within said cavity, wherein said shrink link assembly is accessible through said opening.

2. The landing gear assembly in accordance with claim 1, wherein a portion of said shrink link assembly is positioned within said cavity, wherein said portion is accessible through said opening.

3. The landing gear assembly in accordance with claim 1, wherein said aft brace comprises a first sidewall and a second sidewall that define a channel therebetween, wherein at least a portion of said shrink link assembly is positioned within said channel.

4. The landing gear assembly in accordance with claim 3, wherein said channel is coupled in flow communication with said opening.

5. The landing gear assembly in accordance with claim 1, wherein said shrink link assembly comprises:
    a first link coupled to said aft brace;
    a second link coupled to said first link,
    wherein said inner cylinder is coupled to said second link such that said inner cylinder is accessible through said opening.

6. The landing gear assembly in accordance with claim 5, wherein said shrink link assembly comprises a connecting link comprising a first end coupled to a wing structure of the aircraft and a second end directly coupled to said first link, wherein said second end extends at least partially though said opening.

7. The landing gear assembly in accordance with claim 6, wherein said connecting link comprises:
    a rod portion pivotally coupled to said first link; and
    a fixed portion pivotally coupled to said rod portion and pivotally coupled to the wing structure.

8. An aircraft comprising:
    a wing structure; and
    a landing gear assembly pivotally coupled to said wing structure, wherein said landing gear assembly is moveable between a deployed position and a retracted position, said landing gear assembly comprising:
        a housing comprising a trunnion brace, a drag brace, and an aft brace that together define an opening through said housing, wherein said housing comprises a cylinder portion defining a cavity;
        an inner cylinder positioned within said cavity, wherein said inner cylinder is accessible through said opening; and
        a shrink link assembly coupled between said inner cylinder and said housing and positioned at least partially within said cavity, wherein said shrink link assembly is accessible through said opening.

9. The aircraft in accordance with claim 8, wherein a portion of said shrink link assembly is positioned within said cavity, wherein said portion is accessible through said opening.

10. The aircraft in accordance with claim 8, wherein said drag brace comprises a first distal end and said aft brace comprises a second distal end, wherein said trunnion brace is coupled between said first distal end and said second distal end.

11. The aircraft in accordance with claim 8, wherein said shrink link assembly comprises:
 a first link coupled to said aft brace;
 a second link coupled to said first link,
 wherein said inner cylinder is coupled to said second link such that said inner cylinder is accessible through said opening.

12. The aircraft in accordance with claim 8, further comprising a connecting link comprising a first end coupled to said wing structure and a second end directly coupled to said shrink link assembly, wherein said second end extends at least partially through said opening.

13. The aircraft in accordance with claim 12, wherein said connecting link comprises:
 a rod portion pivotally coupled to said shrink link assembly; and
 a fixed portion pivotally coupled to said rod portion and pivotally coupled to the wing structure.

14. The aircraft in accordance with claim 8, wherein said trunnion brace, said drag brace, and said aft brace are integrally formed.

15. The aircraft in accordance with claim 8, wherein said drag brace and said aft brace form a V-shape.

16. A method of assembling a landing gear assembly for use in an aircraft, said method comprising:
 coupling a trunnion brace, a drag brace, and an aft brace together to form a housing of the landing gear assembly, wherein the trunnion brace, the drag brace, and the aft brace define an opening through the housing, the housing including a cylinder portion defining a cavity;
 positioning an inner cylinder within the cavity, wherein the inner cylinder is accessible through the opening; and
 coupling a shrink link assembly between the inner cylinder and the housing and positioned at least partially within the cavity such that the shrink link assembly is accessible through the opening.

17. The method in accordance with claim 16, wherein coupling the shrink link assembly to the housing comprises positioning a portion of the shrink link assembly in the cavity such that the portion is accessible through the opening, wherein the cavity is coupled in flow communication with the opening.

18. The method according to claim 16, wherein coupling the shrink link assembly to the housing comprises:
 coupling first link of the shrink link assembly to the housing;
 coupling a second link of the shrink link assembly to the first link
 and to the inner cylinder, wherein the inner cylinder is accessible through the opening.

19. The method according to claim 18, wherein coupling the shrink link assembly to the housing comprises coupling a first end of a connecting link to a wing structure of the aircraft and coupling a second end of a wing structure directly to the first link such that the second end extends at least partially through the opening.

20. The method according to claim 19, wherein coupling the connecting link comprises:
 pivotally coupling a rod portion of the connecting link to the first link, and
 pivotally coupling a fixed portion of the connecting link to a wing structure, and pivotally coupling the fixed portion to the rod portion.

\* \* \* \* \*